C. FINGAR.
Ice-Cutters.

No. 151,692.        Patented June 9, 1874.

Witnesses

Inventor

Chas. Fingar

UNITED STATES PATENT OFFICE.

CHARLES FINGAR, OF HUDSON, NEW YORK.

IMPROVEMENT IN ICE-CUTTERS.

Specification forming part of Letters Patent No. 151,692, dated June 9, 1874; application filed February 23, 1874.

*To all whom it may concern:*

Be it known that I, CHARLES FINGAR, of the city of Hudson, in the State of New York, have invented an Ice-Cutting Machine, of which the following is a specification:

The object of my invention is to cut ice rapidly for storing by means of a circular saw supported on an adjustable frame attached to a sleigh which carries its own and the saw's motive power. It is simple in construction and can, therefore, be fully illustrated by one drawing.

Figure 1:
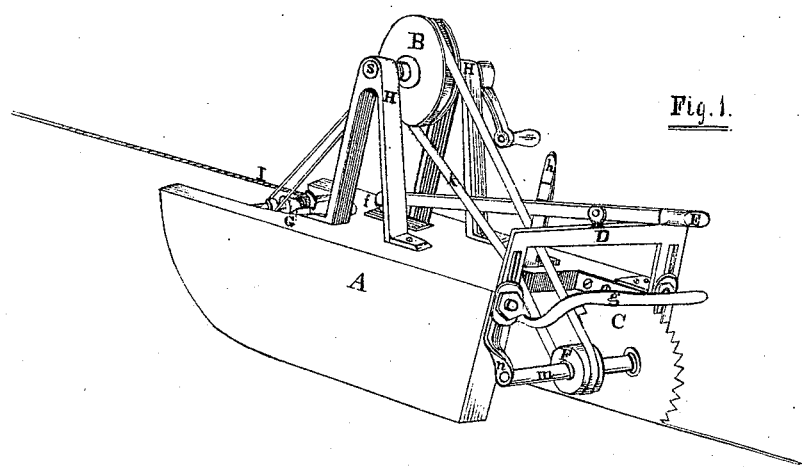

Figure 1 is a perspective view of my invention. It shows the mechanism employed for driving and adjusting the saw.

Figure 2:
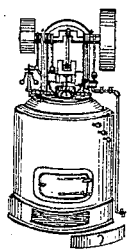

The steam-boiler and engine generally used is one known as the "Baxter steam-engine," (see Fig. 2,) the machinery of which is placed on the top of the boiler. The whole is placed on the strip A in the position of the frame or supports H H, crank-shaft S, and pulley B. This engine, or some other equivalent motive power, is employed to propel the saw C, the windlass G, and the sleigh A. The windlass or shaft and drum G are at the front end of the sleigh, and on it the rope I is wound up, being attached at its opposite end to a stake or bar inserted in the ice at the margin or end of the field it is designed to cut. The belt $k$ extends from the driving-pulley B to the pulley F on the saw-shaft $m$, by which the saw C at the rear end of the sleigh is operated. Another belt extends from the pulley on the opposite end of the shaft S down to the drum-shaft, and operates the drum G. The saw-shaft $m$, together with the saw C and pulley F, is supported by and raised and lowered with the frame D by means of the lever E, having its fulcrum at $f$. This is for adjusting the saw to cut as deep or as shallow as required. It is never desirable to cut through the ice. Two-thirds of its thickness is as deep as necessary to cut. It is then cracked or wedged off or apart in the line of the saw-cut. $g$ is a curved handle attached to the rear end of the sleigh, by which the operator regulates and guides it so far as necessary. With it he swings the machine around to change its direction. The spring-stake $h$, which bears against the lever E, is provided with shoulders or catches to keep the lever in place, and thus prevent the frame D from rising up when not required, keeping the saw C in position. The side bars of frame D are slotted, and slide up and down on bolts or pins in the rear ends of the runners, being provided with nuts and washers outside. Two such levers as E, one on each side of the sleigh, attached to each side or upper corner of the frame D, and united in the rear so as to form one handle, would probably operate the frame more evenly—that is, raise and lower it more steadily. Provision is made for taking up the slack of or tightening the driving-belt $k$. The rope I is attached to a stake or iron bar inserted in the ice at a distance from the field of operation, generally at or near its margin, and passing around the drum G is wound upon it, thus drawing the sleigh and its attachments forward as fast as required until it reaches the stake or margin of the field to be cut. The sleigh is then quickly run back and the operation repeated, or it is swung around and another rope from a stake on the opposite side of the field is attached to the drum, and thus it is drawn back, and so on, alternately repeating the operation, the stakes being moved laterally the width it is desired to cut each course; but another and preferable mode of operating or moving the sleigh is to have a stake set at each end of the field, with a short piece of rope attached having a hook at the end, which is hooked into an eye or a link at the end of the rope on the drum G. This latter is independent of the end ropes, and has such link at each end, being fastened to the drum in the middle, each half being of sufficient length to reach the length of the field.

The saw C is represented in Fig. 1 as in the ice. By extending or lengthening the shaft $m$ two or more saws may be worked on it at the same time, placing them outside the runners, in which case a false runner is placed under the outer end of the shaft to support it, the runner itself being connected by suitable braces to the sleigh A. An adjustable guide or gage is attached to one of these, or to a separate brace, by which to regulate the width of the cut, and to keep the width uniform. The saw-shaft frame D I have contemplated making to move upward and downward in the arc of a circle, whose radius is always the same length from the driving-shaft S, instead of employing a belt-tightener to compensate the slack; or the belt $k$ may be made elastic and answer the same purpose.

What I claim as my invention is—

1. The vertically-adjustable frame or gate D, shaft $m$, pulley F, and circular saw C, in combination with the driving-pulley B of a steam-engine, all arranged on the sleigh A, and operated substantially in the manner and for the purposes herein set forth.

2. The windlass G, provided with the rope I, in combination with a pulley on the driving-shaft S of a steam-engine located on sleigh A, substantially in the manner and for the purpose herein described.

CHAS. FINGAR.

Witnesses:
   POLHEMUS VAN WYCK,
   SHERMAN VAN NESS.